United States Patent
Jimenez et al.

(10) Patent No.: US 10,146,729 B2
(45) Date of Patent: Dec. 4, 2018

(54) CONFIGURABLE PCIE BANDWIDTH UTILIZATION BETWEEN PCI RISER AND OTHER INTERNAL FUNCTIONS

(71) Applicant: Dell Products, L.P., Round Rock, TX (US)

(72) Inventors: Salvador Jimenez, Cedar Park, TX (US); Corey Hartman, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 112 days.

(21) Appl. No.: 15/378,634

(22) Filed: Dec. 14, 2016

(65) Prior Publication Data
US 2018/0165244 A1 Jun. 14, 2018

(51) Int. Cl.
G06F 13/40 (2006.01)
G06F 13/42 (2006.01)

(52) U.S. Cl.
CPC ...... G06F 13/4282 (2013.01); G06F 13/4022 (2013.01)

(58) Field of Classification Search
CPC .................. G06F 13/4282; G06F 13/4022
See application file for complete search history.

(56) References Cited

U.S. PATENT DOCUMENTS

| 2017/0185810 A1* | 6/2017 | Beals | G06K 7/0056 |
| 2018/0006391 A1* | 1/2018 | Alcorn | H01R 12/778 |

* cited by examiner

Primary Examiner — Idriss N Alrobaye
Assistant Examiner — Ronald T Modo
(74) Attorney, Agent, or Firm — Fogarty LLP

(57) ABSTRACT

Embodiments allow an IHS to be configured for different distributions of available PCIe bandwidth. An IHS is reconfigured by utilizing different PCIe riser cards that interface with the PCIe bus of the IHS and route different portions of the available PCIe lanes. PCIe bandwidth may be further distributed using an interposer card that allows a portion of the PCIe bandwidth to be routed to a PCIe device that is supported by the PCIe interposer card. The IHS may be reconfigured by manually switching the riser cards and interposer that are coupled to the IHS. The PCIe distribution is reconfigured without relying on hardware switching components that redirect PCIe lanes. The riser cards and the interposer are coupled to a PCIe baseboard connector of the IHS, where the baseboard connector is divided into two baseboard sub-connectors that each interface with the PCIe bus of the IHS.

20 Claims, 7 Drawing Sheets

CONFIGURABLE PCIE BANDWIDTH UTILIZATION BETWEEN PCI RISER AND OTHER INTERNAL FUNCTIONS

FIELD

This disclosure relates generally to the configuration of an Information Handling System (IHS), and more specifically, to the allocation of PCIe bandwidth within an IHS.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may utilize various protocols and standards for communicating with internal components of the IHS and with the external components and systems that are supported by the IHS. PCIe (Peripheral Component Interconnect Express) is a high-bandwidth input/output (I/O) interface or data bus that is commonly used by IHSs as a communication mechanism. Because of its high-speed data transmission capabilities, PCIe is used as a communication interface for many types of components, including graphics cards, streaming multimedia devices, network cards, USB cards and certain types of storage devices. PCIe may also be used for establishing direct high-speed connections between IHSs that are in close proximity to each other and are configured as a computing cluster, such as in an enterprise data center implementation. The components of an IHS that utilize PCIe may include integrated components of the IHS as well as removable components that are coupled to the IHS via the use of expansion cards.

PCIe devices typically interface with a PCIe bus provided by an IHS. A PCIe bus connection is logically organized into data pathways referred to as lanes, where each lane consists of two differential pairs of signaling wires. One of the differential pairs of each lane is used for transmission of PCIe data and the other differential pair is used for receiving PCIe data. In server applications, common PCIe connections include eight lane (×8), sixteen lane (×16) and thirty-two lane (×32) connections. Various other bandwidth PCIe connections may be supported by an IHS based on the types of PCIe devices and components that are supported by the IHS. PCIe supports the grouping of multiple lanes into higher bandwidth PCIe connections that may be referred to as links. The greater the number of lanes within link, the higher the bandwidth of the link. For instance, within an ×32 PCIe bus, the lanes may be grouped into four ×8 bandwidth PCIe links, two ×16 bandwidth PCIe links, or into combinations of links of various other bandwidths.

An IHS typically includes a printed circuit board (also referred to as a motherboard or a baseboard) that includes various different connectors. The form factor of each connector may conform to a particular standard or protocol that is supported by the connector and thus also determines the components that may be coupled to the IHS using the connector. Certain connectors may serve as expansion slots that allow different cards to be electrically coupled to the IHS in order to provide additional capabilities to the system. For instance, a PCIe network card may be coupled to an IHS via a PCIe connector provided on the motherboard of the IHS. Certain of these connectors provided by an IHS may allow components to interface with one of the communications buses utilized by the IHS. For example, a PCIe connector provided on the motherboard of the IHS may allow the components coupled to the connector to interface with the PCIe bus utilized by the IHS.

One aspect of utilizing PCIe communications is the relatively fixed nature of PCIe connections. In order to couple a PCIe compliant device to a PCIe bus, a number of the available PCIe lanes are dedicated to this connection to the PCIe compliant device. The greater the number of lanes dedicated to a PCIe connection, the greater the portion of the available PCIe bandwidth that is consumed by the PCIe connection. The lanes dedicated to a PCIe connection remain reserved for the exclusive use of the PCIe compliant device as long as it remains coupled to the PCIe bus. Due to the many advantages provided by PCIe connections, including the ability to configure high-speed connections between components, there is typically no shortage of demand for the available PCIe bandwidth. As such, the available PCIe bandwidth must be allocated among the competing priorities of an IHS. However, for IHSs such as servers that may be periodically repurposed and/or reconfigured, the demands for PCIe bandwidth may nonetheless change over time.

SUMMARY

Embodiments provide the ability to re-configure an IHS for different distributions of available PCIe bandwidth. Using the provided embodiments, an IHS may be reconfigured for different distributions of available PCIe bandwidth by utilizing different PCIe riser cards that interface with the PCIe bus of the IHS. Embodiments also provide a PCIe interposer card that allows a portion of the available PCIe bandwidth to be routed to a specific PCIe device that is supported by the PCIe interposer card. The interposer interfaces with the PCIe bus of the IHS and provides a PCIe interface that is compliant with the form factor of the PCIe device. The IHS may be reconfigured by manually switching the riser cards and interposer that are coupled to the IHS without relying on hardware switching components for redirecting the PCIe lanes to support different distributions of available PCIe bandwidth.

According to various embodiments, an IHS includes a PCIe (Peripheral Component Interconnect Express) bus comprising a plurality of PCIe lanes and further includes a PCIe baseboard connector coupled to the PCIe bus, wherein the PCIe baseboard connector comprises a first baseboard sub-connector and a second baseboard sub-connector. The PCIe baseboard connector interfaces with a first riser card that distributes the plurality of PCIe lanes to one or more PCIe connectors provided on the first riser card, wherein the first riser card connects to the first baseboard sub-connector and the second baseboard sub-connector. The PCIe baseboard connector further interfaces with a second riser card that distributes a first portion of the plurality of PCIe lanes to one or more connectors provided on the second riser card, wherein the second riser card connects to the first baseboard sub-connector. The PCIe baseboard connector further interfaces with an interposer card that distributes a second portion of the plurality of PCIe lanes to a PCIe compliant device, wherein the interposer card connects to the second baseboard sub-connector.

In various additional embodiments, the interposer card comprises a PCIe interface for establishing a PCIe connection with the PCIe compliant device. In various additional embodiments, the PCIe compliant device is an I/O (Input/Output) controller installed as a component of the IHS. In various additional embodiments, the I/O controller is a storage controller. In various additional embodiments, the PCIe interface of the interposer card is a PCIe form factor supported by the storage controller. In various additional embodiments, the PCIe baseboard connector comprises ×32 PCIe lanes, the first baseboard sub-connector comprises ×8 PCIe lanes and the second baseboard sub-connector comprises ×24 PCIe lanes.

According to various embodiments, a system for coupling a PCIe compliant device to a PCIe bus connection includes a baseboard comprising a PCIe baseboard connector providing an interface to the PCIe bus connection; a retention and support housing, wherein the retention and support housing provides a mechanical support for attaching the PCIe compliant device to the baseboard and wherein the retention and support housing comprises a surface for receiving a portion of an interposer, and the interposer comprising a first PCIe interface for coupling with the PCIe baseboard connector and further comprising a second PCIe interface for coupling with the PCIe compliant device, wherein a portion of the interposer rests on the receiving surface of the retention and support housing when coupled with the PCIe baseboard connector and the PCIe compliant device.

In various additional embodiments, the retention and support housing comprises two or more pins, and wherein the interposer comprises two or more holes that correspond respectively to the two or more pins. In various additional embodiments, the two or more pins of the retention and support housing are mated respectively with the two more holes of the interposer to rest the portion of the interposer on the receiving surface of the retention and support housing. In various additional embodiments, the two more holes of the interposer traverse the second PCIe interface that couples with the PCIe compliant device. In various additional embodiments, the retention and support housing comprises two or more interposer clips that retain the interposer such that the portion of the interposer rests on the receiving surface of the retention and support housing. In various additional embodiments, the interposer clips further retain the interposer such that the interposer is coupled to the PCIe baseboard connector and the PCIe compliant device. In various additional embodiments, the PCIe compliant device is a storage controller configured to operate using the PCIe bus connection.

According to various embodiments, a system for coupling a PCIe compliant device to a PCIe bus includes a PCIe (Peripheral Component Interconnect Express) bus comprising a plurality of PCIe lanes; a PCIe baseboard connector coupled to the PCIe bus, wherein the PCIe baseboard connector comprises a first baseboard sub-connector and a second baseboard sub-connector a first riser card that distributes the plurality of PCIe lanes to one or more PCIe connectors provided on the first riser card, wherein the first riser card connects to the first baseboard sub-connector and the second baseboard sub-connector; a second riser card that distributes a first portion of the plurality of PCIe lanes to one or more connectors provided on the second riser card, wherein the second riser card connects to the first baseboard sub-connector; and an interposer card that distributes a second portion of the plurality of PCIe lanes to the PCIe compliant device, wherein the interposer card connects to the second baseboard sub-connector.

In various additional embodiments, the system further includes a retention and support housing, wherein the retention and support housing provides a mechanical support for attaching the PCIe compliant device to a baseboard and wherein the retention and support housing comprises a surface for receiving a portion of an interposer card; and the interposer card further comprising a first PCIe interface for coupling with the second baseboard sub-connector and further comprising a second PCIe interface for coupling with the PCIe compliant device, wherein a portion of the interposer rests on the receiving surface of the retention and support housing when coupled with the second baseboard sub-connector and the PCIe compliant device. In various additional embodiments, the PCIe compliant device is an I/O (Input/Output) controller installed as a component of the IHS. In various additional embodiments, the I/O controller is a storage controller. In various additional embodiments, the interposer card is a PCIe form factor supported by the storage controller. In various additional embodiments, the retention and support housing comprises two or more pins, and wherein the interposer comprises two or more holes that correspond respectively to the two or more pins. In various additional embodiments, the two or more pins of the retention and support housing are mated respectively with the two more holes of the interposer to rest the portion of the interposer on the receiving surface of the retention and support housing.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
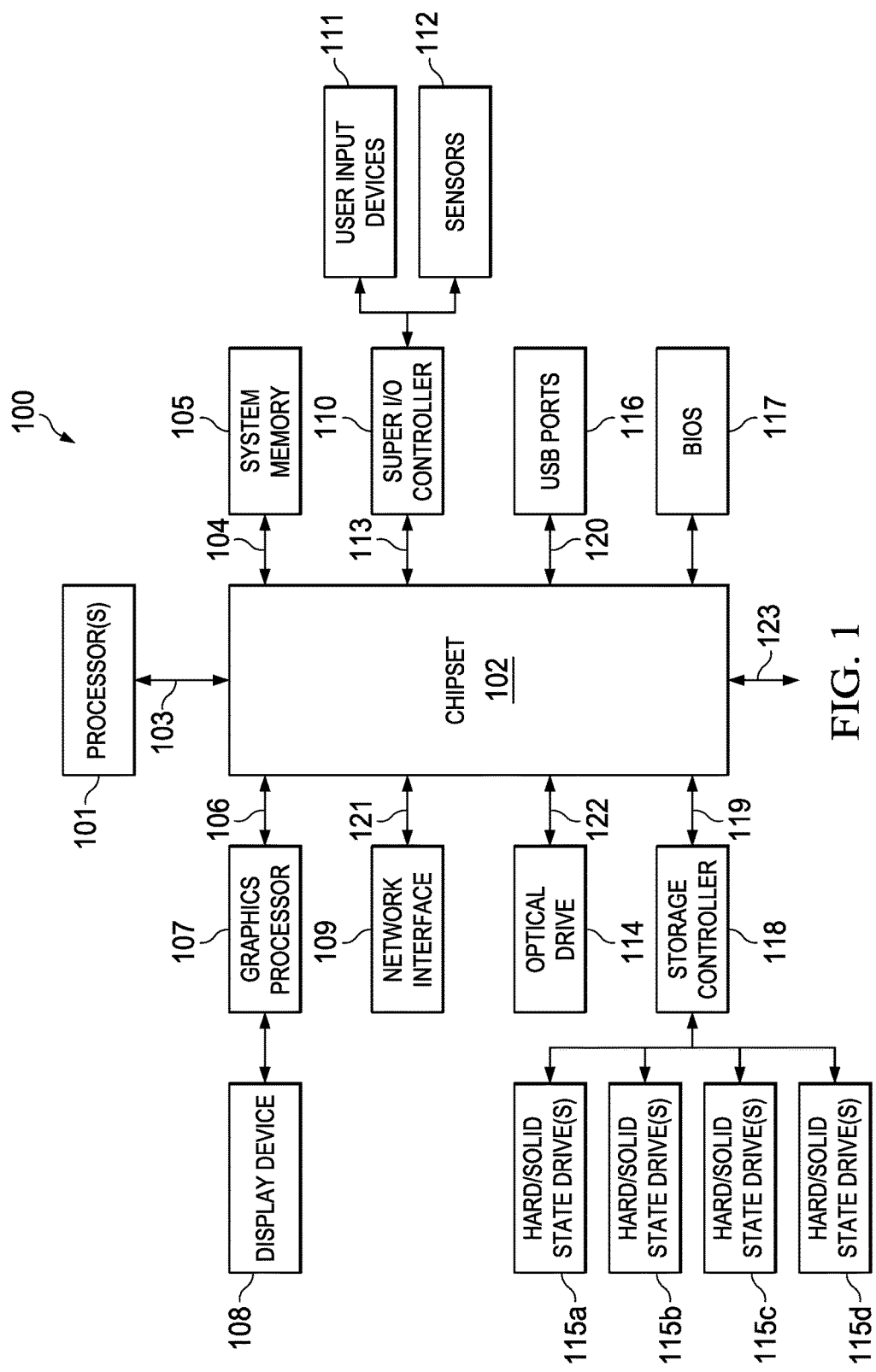
FIG. 1 is a block diagram depicting certain components of an IHS according to various embodiments.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain embodiments described herein may be discussed in the context of a server computer or personal computer, other embodiments may be utilized.

FIG. 1 is a block diagram of an IHS 100 configured according to certain embodiments to support communications that utilize a PCIe bus. IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a chipset 102 that may include one or more integrated circuits that are connect to processor(s) 101. In certain embodiments, the chipset 102 may utilize a QPI (QuickPath Interconnect) bus 103 for communicating with the processor(s) 101. Chipset 102 provides the processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Chipset 102 may also provide access to a graphics processor 107. In certain embodiments, graphics processor 107 may be comprised within one or more video or graphics cards that have been installed as components of the IHS 100. Graphics processor 107 may be coupled to the chipset 102 via a graphics bus 106 such as provided by an AGP (Accelerated Graphics Port) bus, a PCIe (Peripheral Component Interconnect Express) bus. In certain embodiments, graphics processor 107 generates display signals and provides them to a display device 108 that may be coupled directly to the IHS 100 or may be located remoted from the IHS 100.

In certain embodiments, chipset 102 may also provide access to one or more user input devices 111. In such embodiments, chipset 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communications with one or more sensor devices 112, which may include environment sensors, such as a temperature sensor or other cooling system sensors. The I/O devices, such as the user input devices 111 and the sensor devices 112, may interface super I/O controller 110 through wired or wireless connections. In certain embodiments, the super I/O controller 110 may be coupled to the super I/O controller 110 via a Low Pin Count (LPC) bus 113.

Other resources may also be coupled to the processor(s) 101 of the IHS 100 through the chipset 102. In certain embodiments, chipset 102 may be coupled to a network interface 109, such as provided by a Network Interface Controller (NIC) that is coupled to the IHS 100. In certain embodiments, the network interface 109 may be coupled to the chipset 102 via a PCIe bus. According to various embodiments, network interface 109 may support communication via various wired and/or wireless networks. Chipset 102 may also provide access to one or more hard disk and/or solid state drives 115*a-d*. In certain embodiments, the chipset 102 may also provide access to one or more optical drives 114 or other removable-media drives. Any or all of the drive devices 114 and 115*a-d* may be integral to the IHS 100, or may be located remotely from the IHS 100. In certain embodiments, the chipset 102 may also provide access to one or more Universal Serial Bus (USB) ports 116.

Another resource that may be accessed by processor(s) 101 via chipset 102 is a BIOS (Basic Input/Output System) 117. Upon booting of the IHS 100, processor(s) 101 may utilize BIOS 117 instructions to initialize and test hardware components coupled to the IHS 100 and to load an Operating System (OS) for use by the IHS 100. The BIOS 117 provides an abstraction layer that allows the operating system to interface with certain hardware components that are utilized by IHS 100. Via this hardware abstraction layer provided by BIOS 117, the software executed by the processor(s) 101 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In certain embodiments, IHS 100 may be configured as a server or server system that provides a service to one or more other IHSs. For instance, a server may be an application server dedicated to running and providing the functionality of one or more software applications. In other scenarios, a server may be a database server that provides access to databases and database services. In other scenarios, a server may be a file server that provide file services, such as part of a cloud implementation that hosts collections of media files. In certain scenarios, a server may be a web server that communicates with HTTP (Hypertext transfer protocol) clients in receiving and responding to various types of requests, such as in support of e-commerce transactions. In other scenarios, IHS 100 may be configured as various other types of servers that may incorporate certain aspects of these specifically identified servers.

In the illustrated embodiment, IHS 100 includes four storage drives 115a-d. In various embodiments, the four storage drives 115a-d may include SAS (Serial Attached SCSI) magnetic disk drives, SATA (Serial Advanced Technology Attachment) magnetic disk drives, solid-state drives (SSDs) and other types of storage drives in various combinations. Each of the storage drives 115a-d may be located within the enclosure of the IHS 100, or alternatively one or more of the storage drives 115a-d may instead be external to IHS 100. One or more of the storage drives 115a-d may instead be located remotely from IHS 100 and may be configured as network attached storage devices. Using these four storage drives 115a-d, IHS 100 may be configured as a server that provides various services as a part of a cloud implementation of multiple servers that may be distributed across multiple physical locations. In certain embodiments, the four storage drives 115a-d may be components of a RAID (Redundant Array of Independent Disks) system. Configured as a component of a RAID system, IHS 100 provides data storage services where data received from a client is distributed across the four storage drives 115a-d in a manner that creates redundancy of the received data and reduces the risk of information being lost due to the failure of any one of the storage drives 115a-d.

In providing storage services, IHS 100 is utilizes a storage controller 118 that provides access to the four storage drives 115a-d. In certain embodiments, the storage controller 118 may be a RAID controller that is configured to provide access to storage drives 115a-d as components of a RAID system. In various embodiments, storage controller 118 may be comprised of hardware and software that is configured to provide storage and retrieval of data from the storage drives 115a-d. In certain of such embodiments, storage controller 118 may be a DELL PowerEdge Raid Controller (PERC) or other disk array controller. In certain embodiments, the storage controller 118 may be configured to provide access to the four storage drives 115a-d as a single storage device as part of a distributed data storage solution. Certain embodiments may utilize additional storage controllers that provide access to additional storage devices.

In order to interact with other components of the distributed storage system, such as a RAID system, storage controller 118 may be accessed via the chipset 102 using a PCIe bus 119. PCIe communication capabilities may be integrated within the storage controller 118. As described, PCIe devices may use multi-lane links, thus establishing high-bandwidth PCIe connections. For instance, in certain embodiments, the storage controller utilizes an ×8 PCIe connection via the PCIe bus 119. In various embodiments, IHS 100 is configured to utilize PICe for transmitting communications with components in addition to storage controller 118. Using PCIe, IHS 100 may be connected to other PCIe compliant devices which provide IHS 100 with additional functionality. For instance, the bus interfaces for the graphics processor 106, the network controller 121, the optical drive 122, the USB ports 120 may also be PCIe connections that utilize links of various bandwidths. In certain embodiments, IHS 100 may also utilize a multi-lane PCIe bus 123 for interfacing directly with neighboring IHSs in the formation of clusters of IHSs that may be used for various enterprise or scientific computing tasks.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
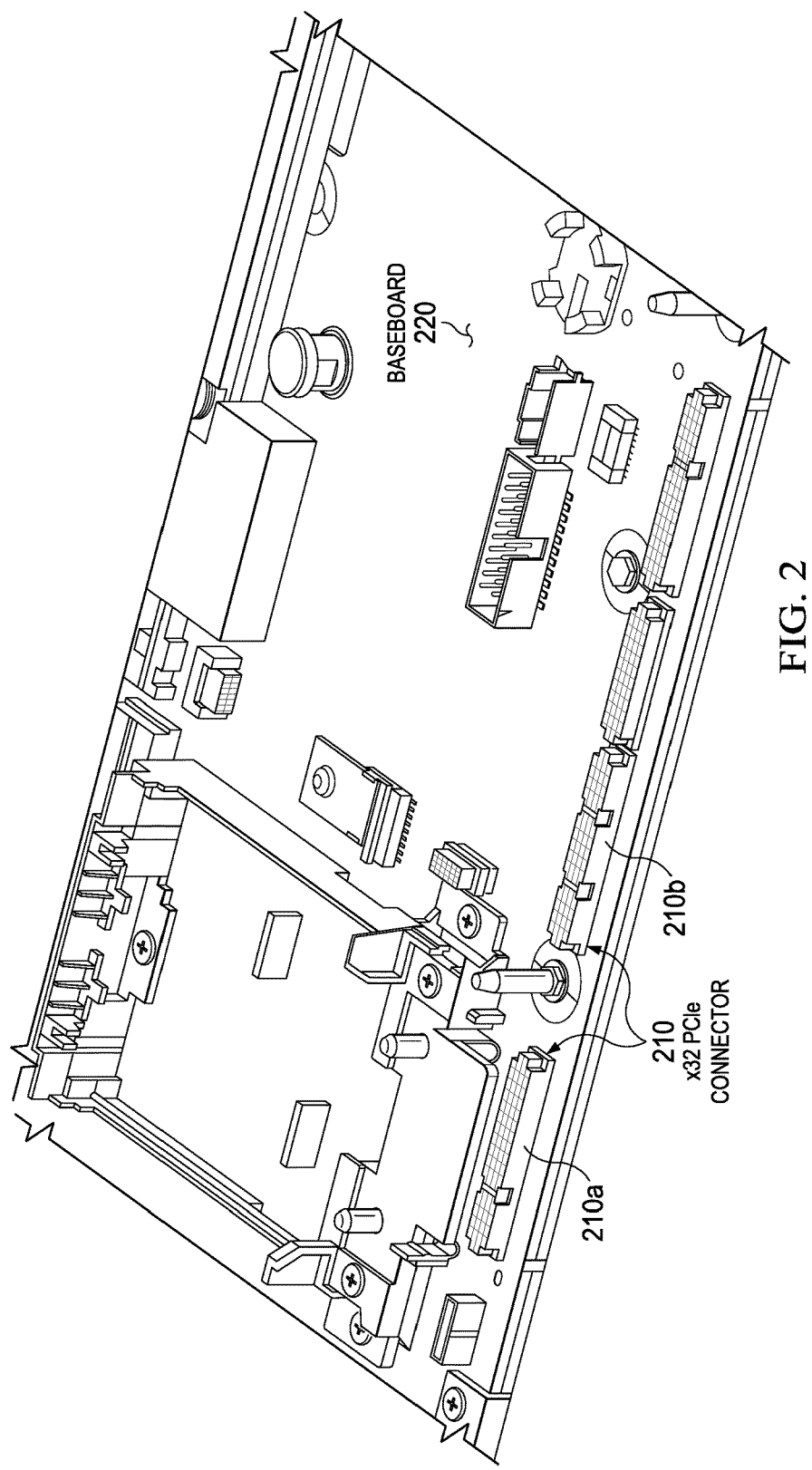
FIG. 2 is a diagram depicting certain internal physical components of an IHS configured according to various embodiments for allocating available PCIe bandwidth.

FIG. 2 depicts certain components of a baseboard 220 (i.e., motherboard) used within an IHS according to various embodiments. One of the components installed on the baseboard 220 is a PCIe baseboard connector 210. The PCIe baseboard connector 210 provides an interface by which one or more PCIe compliant devices may be coupled to an IHS and coupled to a PCIe bus supported by the IHS. With reference to the embodiment of FIG. 1, PCIe baseboard connector 210 may provide an interface to the PCIe bus 123 that is accessed by components of the IHS 100 via the chipset 102. In the embodiment illustrated in FIG. 2, the PCIe connector baseboard 110 is a thirty-two lane (×32) connection. In certain other embodiments, PCIe baseboard connector 210 may provide different numbers of lanes that may provide more or less PCIe bus bandwidth.

In a conventional baseboard, the form factor of a PCIe baseboard connector is typically a single connector that supports a single PCIe connection. An individual baseboard connector may be referred to as a slot, where each slot provides an interface for electrically coupling a PCIe card to the baseboard. In the embodiment of FIG. 2, the baseboard PCIe connector 210 is split into two sub-connectors 210a and 210b. The baseboard 220 is configured such that the two sub-connectors 210a and 210b may provide a single high-bandwidth PCIe link to the PCIe bus or may operate as two separate lower-bandwidth PCIe links to the PCIe bus.

In the illustrated embodiment, the ×32 lanes of the baseboard PCIe connector 210 are split such that ×8 lanes are routed to a first sub-connector 210a and the remaining ×24 lanes are routed to a second sub-connector 210b. Configured in this manner, the baseboard PCIe connector 210 provides the ability to utilize the two sub-connectors 210a and 210b together or separately in order to provide a single ×32 lane PCIe link or instead to provide an ×8 PCIe link and a 24x PCIe link.

Figure 3A:
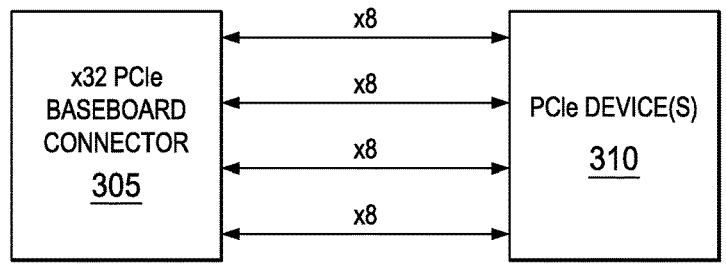
FIG. 3a is a block diagram illustrating one scenario in which available PCIe bandwidth is allocated.

FIG. 3a depicts one scenario in which the PCIe lanes provided by a PCIe baseboard connector 305 may be distributed for use within an IHS. In the illustrated scenario, the ×32 PCIe lanes serve as a communication bus between the PCIe baseboard connector 305 and the one or more processors 310. The ×32 lanes of the PCIe baseboard connector 305 may be organized into four individual ×8 PCIe links that may each be coupled to a PCIe bus used by a PCIe device, thus allowing the IHS to interface with four different ×8 PCIe devices. In other scenarios, the ×32 lanes of PCIe bandwidth may be allocated into different sized PCIe links, such as a single ×32 lane link to a high-bandwidth PCIe device or two lower-bandwidth ×16 lane links to two different PCIe devices.

Figure 3B:
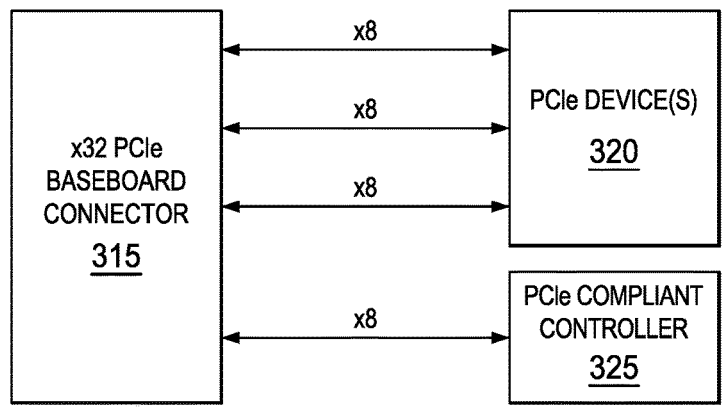
FIG. 3b is a block diagram illustrating another scenario in which available PCIe bandwidth is allocated.

FIG. 3b depicts a different scenario in which the available PCIe lanes provided by a PCIe baseboard connector 315 are distributed. In the scenario of FIG. 3b, a portion of the available PCIe bandwidth is utilized for a controller component 325. For instance, in scenarios where the IHS is used as part of a RAID storage solution, the IHS may utilize a RAID controller or other storage controller that manages the use of one or more storage drives of the IHS as components of a RAID configuration. In certain scenarios, the RAID controller is a PCIe compliant controller 325 that interfaces with the PCIe bus of the IHS. In other scenarios, other types of PCIe compliant controllers 325, in particular I/O (Input/Output) controllers, may be utilized by the IHS. As a PCIe device that interfaces with the PCIe bus of the IHS, the PCIe compliant controller 325 requires the use of a certain portion of the PCIe bandwidth provided by the PCIe baseboard connector 315. Such configurations allow the IHS to utilize all of the available PCIe bandwidth for a single purpose.

In the illustrated scenario of FIG. 3b, the ×32 lanes of PCIe bandwidth provided by the PCIe baseboard connector 315 are separated into an ×8 PCIe link utilized by the PCIe compliant controller 325 and three separate ×8 links that are each used to connect to one or more PCIe compliant devices 320. Other scenarios may utilize different configurations for distributing the available PCIe bandwidth of the PCIe baseboard connector 315. For instance, the PCIe compliant controller 325 may require ×16 lanes of PCIe bandwidth, thus leaving only ×16 PCIe lanes for interfacing with one or more PCIe devices 320. Similarly, the links that are utilized within such scenarios may be organized differently. For instance, the PCIe bandwidth available to the connected PCIe devices 320 may be organized as a single ×16 link and a single ×8 link. In all of these configurations described with respect to FIG. 3b, the available PCIe bandwidth is shared between two competing needs for PCIe bandwidth within the IHS.

These two scenarios described respectively in FIGS. 3a and 3b illustrate two types of scenarios that a manufacturer of an IHS may desire to support. In certain instances, an IHS may be a general purpose server, such as a blade server or a rack server, which can be grouped with other similar servers in providing enterprise level solutions. When deployed in different implementations of groups of servers, an IHS may have different constraints with respect to use of the available PCIe bandwidth. As described with respect to FIG. 3b, in scenarios where an IHS is part of a RAID configuration, a portion of the available PCIe bandwidth may be required for use by a RAID controller or other storage controller. However, as described in FIG. 3a, in some scenarios, available PCIe bandwidth is preferable maximized for a single purpose. Accordingly, IHS manufacturers may prefer to support both types of PCIe bandwidth configurations.

Figure 3C:
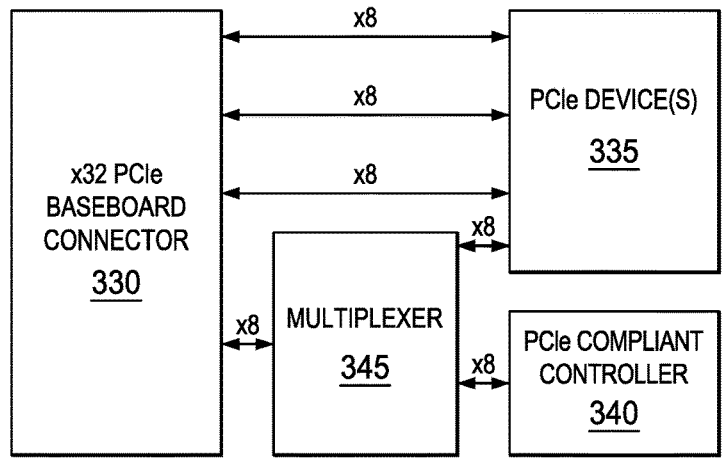
FIG. 3c is a block diagram illustrating a conventional implementation for allocating available PCIe bandwidth.

FIG. 3c depicts one technique that may be implemented by an IHS in order to support both of the scenarios described with respect to FIGS. 3a and 3b. As in the scenarios of FIGS. 3a and 3b, the baseboard PCIe connector 330 provides ×32 lanes of PCIe bandwidth. However, in the scenario illustrated in FIG. 3c, ×8 lanes of the available PCIe bandwidth are routed to a multiplexer 345. The remaining ×24 lanes of PCIe bandwidth are routed from the PCIe baseboard connector 330 directly to one or more PCIe devices 335. In the illustrated scenario, this link to the processor(s) 335 is depicted as three separate ×8 PCIe links, but this PCIe link may instead organize the remaining ×24 PCIe lanes differently, such as a single ×24 lane PCIe link. The multiplexer 345 may be configured to switch between routing ×8 lanes of PCIe bandwidth to one of the PCIe devices 335 or to a PCIe compliant controller 340.

In this manner, both of the configurations of FIGS. 3a and 3b may be supported. However, adding multiplexer 345 results in added cost and complexity. For instance, in order to implement the configuration of FIG. 3c, multiplexer 345 must be incorporated as a component of the baseboard, which includes both financial and design costs. In addition, a mechanism must be provided by which the multiplexer 345 may be configured to switch between its two modes of operation. This added cost and complexity is preferably avoided, especially in light of the fact that this configurability will most likely be used relatively infrequently. A manufacturer of an IHS would preferably be able to support both of the PCIe bandwidth allocations of FIGS. 3a and 3b without the attendant complexities of hardware switching.

Figure 4:
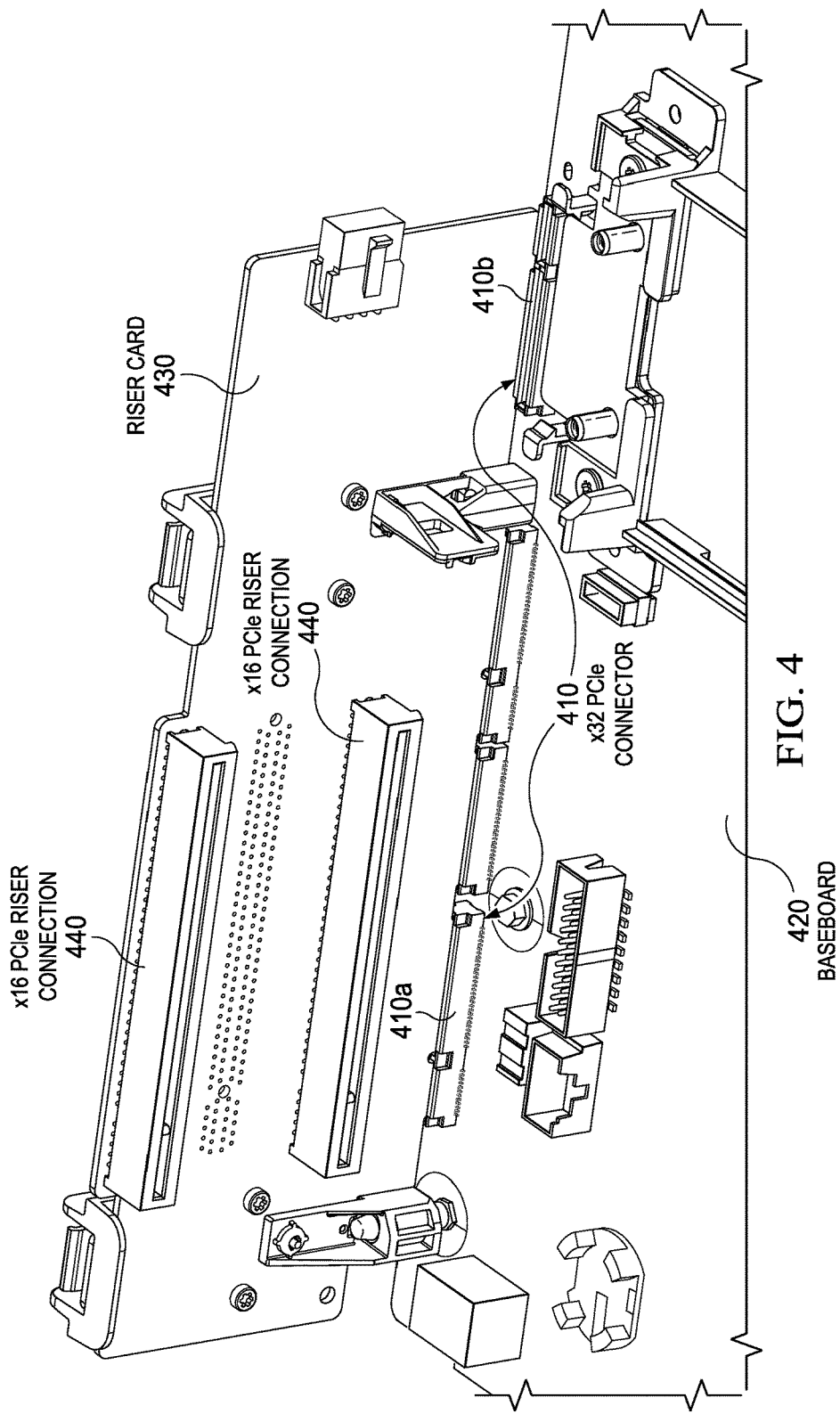
FIG. 4 is a diagram depicting certain additional internal physical components of an IHS configured according to various embodiments for allocating available PCIe bandwidth.

FIG. 4 depicts certain components of an IHS according to various embodiments, where the IHS has been configured to support both of the PCIe bandwidth allocations of FIGS. 3a and 3b. Using the illustrated embodiment, this capability is provided without the use of a multiplexer or other similar hardware component that switches PCIe lanes between two different PCIe compliant components. As described with respect to the embodiment of FIG. 2, the embodiment of FIG. 4 utilizes a PCIe baseboard connector 410 that is split between two PCIe sub-connectors 410a and 410b. In the illustrated embodiment, one of the sub-connectors 410b is an ×8 lane PCIe connection and the other sub-connector 410a is an ×24 lane PCIe connection. In other embodiments, the PCIe baseboard connector 410 may be divided into sub-connectors with other bandwidths, such as two ×16 lane PCIe sub-connectors.

In order to distribute the PCIe bandwidth provided by the PCIe baseboard connector 410, a riser card 430 is utilized. The riser card 430 is manually plugged into the PCIe baseboard connector 410 in order to electrically couple the riser card to the PCIe baseboard connector. The riser card 430 includes a set of connectors, such as edge connectors, that conform to the form factor of the PCIe baseboard connector 410. Once coupled, the riser card 430 distributes the PCIe bandwidth provided by the PCIe baseboard connector 410 to one or more connectors 440 that are located on the riser card. In the illustrated embodiment, the riser card 430 includes two ×16 lane PCIe riser connectors 440. The riser card 430 distributes the ×32 PCIe lanes provided by the PCIe baseboard connector 410 to these two ×16 lane PCIe riser connectors 440. Each of the ×16 lane PCIe riser connectors may then be coupled to an ×16 lane PCIe device, thus enabling the available PCIe bandwidth to be utilized in two high-bandwidth ×16 PCIe devices.

Figure 5:
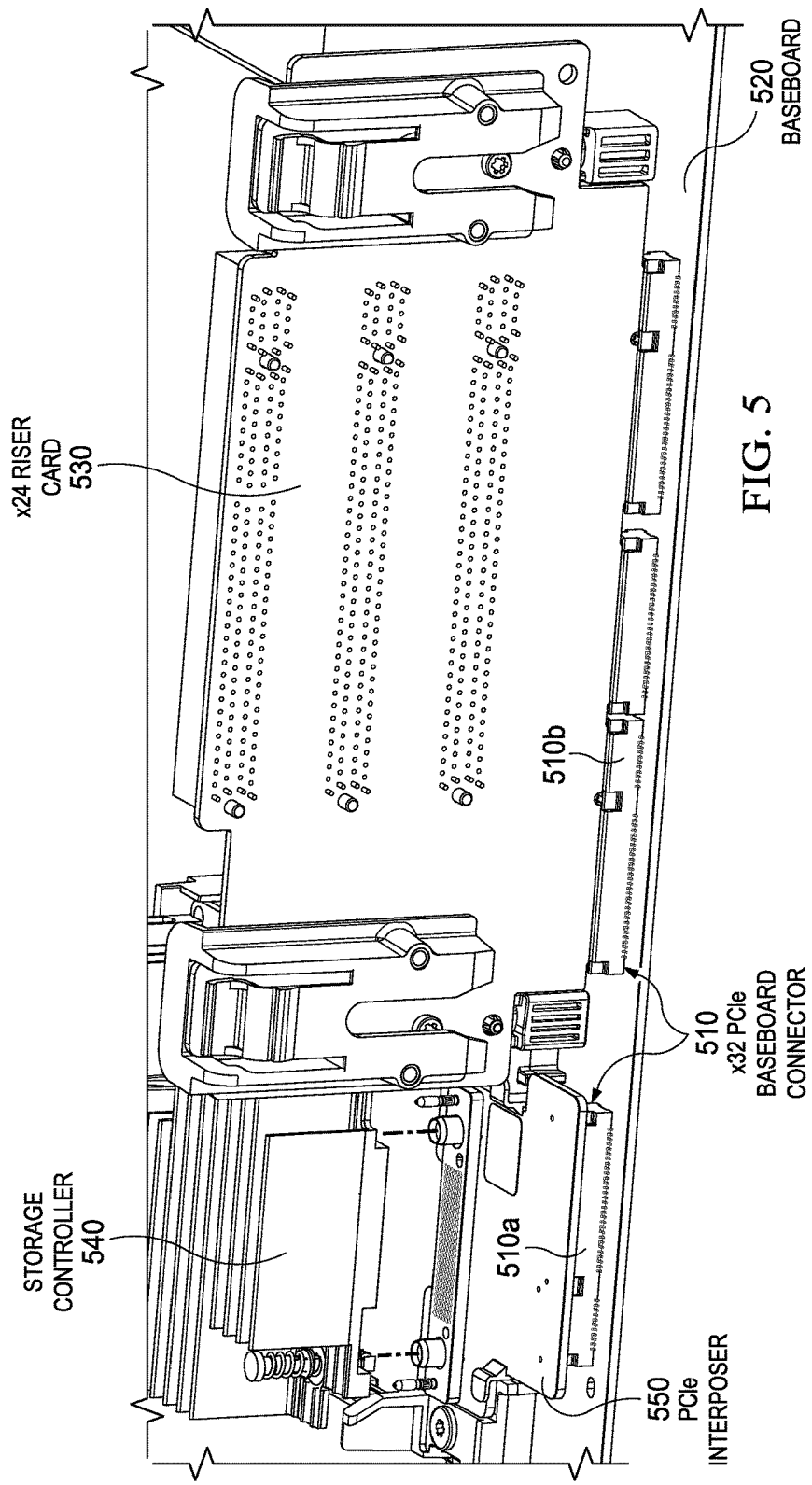
FIG. 5 is a diagram depicting certain additional internal physical components of an IHS configured according to various embodiments for allocating available PCIe bandwidth.

FIG. 5 depicts certain components of the same IHS embodiment described with respect to FIG. 4. In the embodiment of FIG. 4, the riser card 430 is coupled to both sub-connectors 410a and 410b of the PCIe baseboard connector 410 in order to distribute all ×32 lanes of PCIe bandwidth to two ×16 lane PCIe links. In the embodiment of FIG. 5, however, the available PCIe bandwidth provided by the PCIe baseboard connector 510 is being distributed to two different components. The PCIe bandwidth available to one sub-connector 510b of the PCIe baseboard connector 510 is distributed via a riser card 530 that is coupled to this sub-connector 510b. In the illustrated embodiment, riser card 530 receives ×24 lanes of PCIe bandwidth from the connector 510. The ×24 lanes of PCIe bandwidth received by the riser card 530 may then be distributed to one or more PCIe devices via PCIe connectors provided by the riser card. The number of PCIe connectors provided by the riser card and their respective bandwidths may vary in different embodiments.

Instead of coupling both sub-connectors 510a and 510b using a single riser card, as in FIG. 4, one of the sub-connectors 510a is coupled to a PCIe interposer 550. Like the described riser cards, the PCIe interposer 550 is manually plugged into the PCIe baseboard sub-connector 510a in order to electrically couple the PCIe interposer 550 to the PCIe baseboard connector 510. Also like the riser cards, the PCIe interposer 550 includes a set of connectors, such as edge connectors, that conform to the form factor of the PCIe baseboard connector 510a. Once coupled, the PCIe interposer 550 distributes the PCIe bandwidth provided by the PCIe sub-connector 410a to a PCIe compliant device that interfaces with the PCIe interposer 550. In the illustrated embodiment, the PCIe interposer 550 routes the PCIe bandwidth from the PCIe sub-connector 410a to a storage controller 540. In certain embodiments, this storage controller 540 may be a RAID controller. In other embodiments, the PCIe compliant device supported by the PCIe interposer 550 may be one of various types of I/O controllers that are configured to interface with the PCIe bus.

Figure 6:
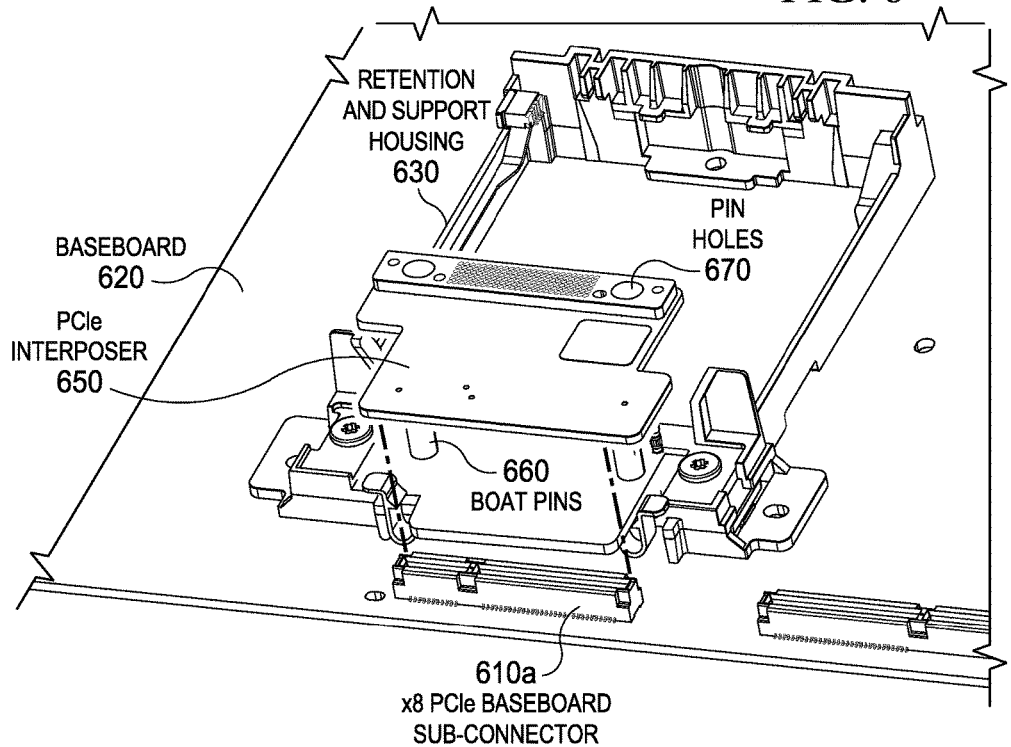
FIG. 6 is a diagram depicting certain additional internal physical components of an IHS configured according to various embodiments for allocating available PCIe bandwidth.

FIG. 6 illustrates the coupling of the PCIe interposer 650. As illustrated, the PCIe interposer 650 is plugged into the PCIe baseboard sub-connector 610a, thus electrically coupling the PCIe interposer 550 to the PCIe bus of the IHS. In the illustrated embodiment, the PCIe baseboard sub-connector 610a provides an ×8 lane PCIe bus connection. In other embodiments, the PCIe interposer 650 may be utilized with a PCIe baseboard sub-connector with other bandwidths. As illustrated, when the PCIe interposer 650 is plugged into the PCIe baseboard sub-connector 610a, the PCIe interposer 650 rests on a structure referred to as a retention and support housing 630. The retention and support housing 630 is a mechanical structure mounted to the baseboard 620. In the illustrated embodiment, the retention and support housing 630 is fastened to the baseboard 620 using screws. Other embodiments may utilize other mechanisms for attaching the retention and support housing 630 to the baseboard 620. The retention and support housing includes surfaces and/or structures that are designed to receive the PCIe interposer 650. In the illustrated embodiment, the retention and support housing 630 is designed to receive a storage controller, or another PCIe device. Accordingly, the retention and support housing 630 is designed both to couple with the PCIe interposer 650 and to provide a base for attaching the PCIe compliant devices, such as a storage controller, to the baseboard 620.

In particular, the retention and support housing 630 includes two pins 660 that are situated in order to mate with two corresponding pin holes 670 provided by the PCIe interposer 650. When the PCIe interposer 650 is plugged into the PCIe baseboard sub-connector 610a, each of the pin holes 670 of the PCIe interposer 650 receives one of the pins 660 of the retention and support housing 630. Mated in the manner, a portion of the PCIe interposer 650 rests on a portion of the retention and support housing 630. Other embodiments may utilize different configurations of corresponding pins and pin holes in order to orient the PCIe interposer on the surface provided by the retention and support housing 630 on which a portion of the PCIe interposer 650 rests.

Figure 7A:
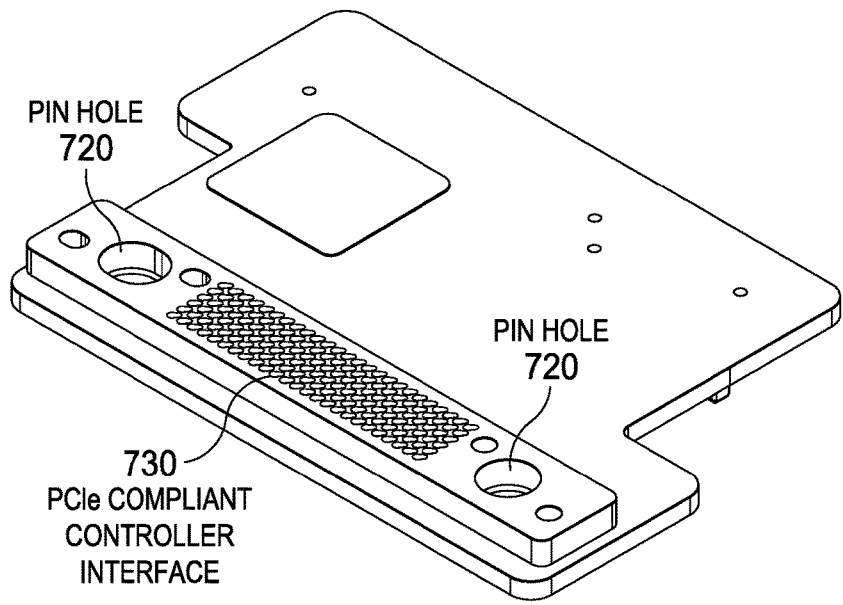
FIGS. 7*a* and 7*b* are diagrams depicting an interposer card configured according to various embodiments for allocating available PCIe bandwidth.
Figure 7B:
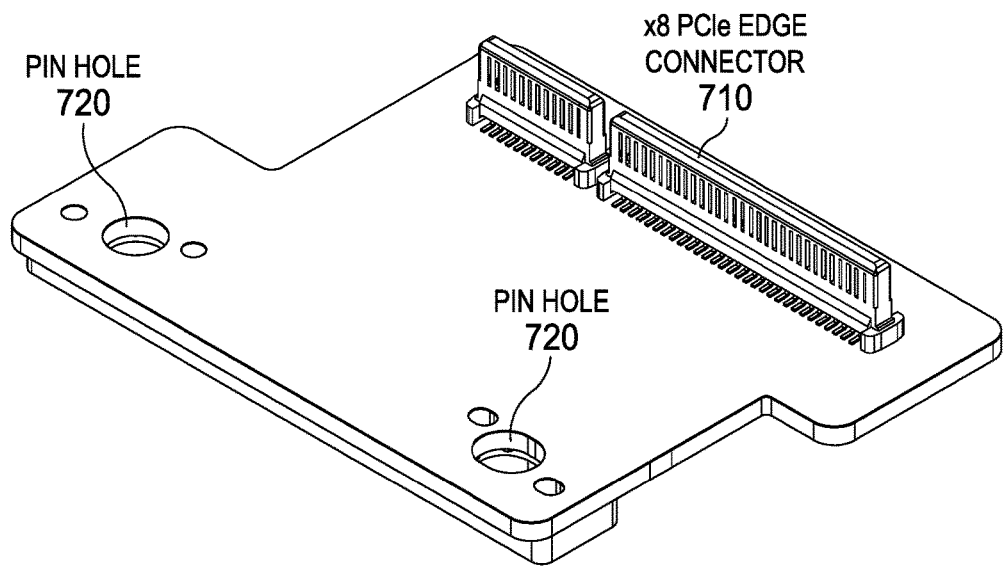

FIG. 7 illustrates a PCIe interposer such as utilized in the embodiment of FIG. 6. FIG. 7b depicts a bottom side of the PCIe interposer, where the bottom side includes a PCIe connector 710 that couples to the PCIe baseboard connector. Similar to the described riser cards, the PCIe connector 710 of the PCIe interposer conforms to the form factor utilized by the PCIe baseboard connector. FIG. 7a depicts a top side of the PCIe interposer. Both FIGS. 7a and 7b depict pin slots 720 that mate with the pins described with respect to FIG. 6. FIG. 7a also depicts a PCIe compliant controller interface 730 that is attached to the PCIe interposer and provides an interface to a PCIe device.

As described with respect to the above embodiments, the PCIe interposer distributes a portion of the available PCIe bandwidth provided by the PCIe baseboard connector to a PCIe compliant device such as a RAID controller, storage controller or other type of PCIe compliant controller. The PCIe compliant controller interface 730 conforms to the PCIe form factor utilized by the PCIe compliant device that is being coupled to the PCIe bus of the IHS by the PCIe interposer. In the illustrated embodiment, the depicted PCIe compliant controller interface 730 is a storage controller interface. In other embodiments, the PCIe compliant controller interface 730 may conform to any form factor that supports a PCIe connection. The PCIe interposer is configured to serve as an intermediary between the PCIe bus connection provided by the PCIe baseboard sub-connector and the form factor utilized by the PCIe compliant component. In this manner, different embodiments may utilize different PCIe interposers in order to couple different PCIe compliant devices to the PCIe bus connection provided by the PCIe baseboard sub-connector.

Figure 8:
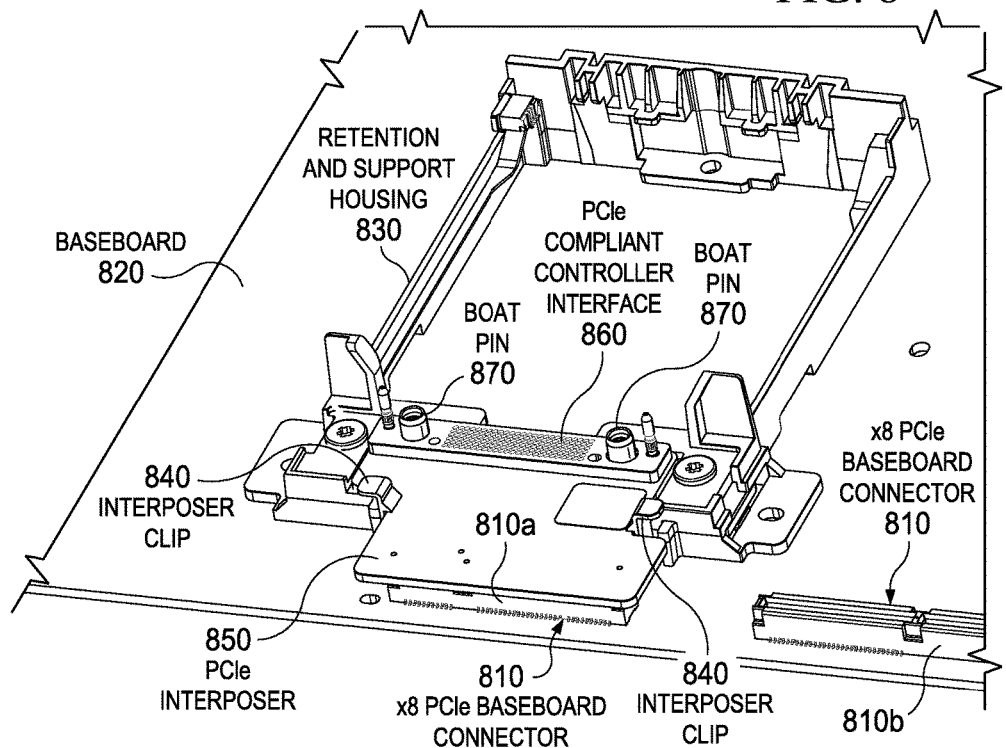
FIG. 8 is a diagram depicting certain additional internal physical components of an IHS configured according to various embodiments for allocating available PCIe bandwidth.

FIG. 8 illustrates an embodiment where the PCIe interposer 850 has been coupled to the retention and support housing 830 and the PCIe baseboard sub-connector 810a. The PCIe interposer 850 is plugged into the PCIe baseboard sub-connector 810 and a portion of the PCIe interposer rests on a surface provided by the retention and support housing 830. In addition, the pin holes of the PCIe interposer are mated with the pins 870. As illustrated in FIGS. 7a, the pin holes 720 traverse both the card from which the PCIe interposer is formed and the PCIe compliant controller interface 730 that is attached to the interposer card. By traversing the PCIe compliant controller interface 860, the pin holes of the PCIe interposer 850 serve to orient the PCIe compliant controller interface 860 in a specific position that enables the PCIe connector 710 of the PCIe interposer 850 to be plugged into the PCIe baseboard sub-connector 810a, while also coupling the PCIe interposer 850 to the retention and support housing 830. Via the mating of the pins 870 with the pin holes 720 that traverse the PCIe compliant controller interface 860, the PCIe interposer 850 is also oriented in a position that enables the PCIe compliant device to be coupled to the PCIe compliant controller interface 860. In the illustrated embodiment, the position of the PCIe interposer 850 that is determined by the mating of the pins 870 and pin holes 720 allows a PCIe device, such as a storage controller, to be attached to the retention and support housing 830 such that the PCIe connection provided by the PCIe device is positioned to mate with the PCIe compliant controller interface 860 of the PCIe interposer.

This configuration of the pin holes in the PCIe interposer 850 and the pins 850 serves to orient the PCIe interposer relative to both the retention and support housing 830 and the PCIe baseboard sub-connector 810*a*. This orientation of the PCIe interposer 850 that is specified by the pins 850 and pin holes is determined in two dimensions by the pins 850 and pin holes 720. The pins 850 and pin holes orient the PCIe interposer 850 along the two lateral sides of the baseboard 820. In other terms, the pins 850 and pin holes orient the PCIe interposer with respect to the x-axis and y-axis of the baseboard 820. FIG. 8 depicts two interposer clips 840 that are components of the retention and support housing 830. These interposer dips 840 receive the PCIe interposer 850 and lock the PCIe interposer 850 in position once it has been correctly coupled.

When the PCIe interposer 850 is installed, it is oriented between the PCIe baseboard sub-connector 810 and the retention and support housing 830 using the pins 870 and pin holes of the PCIe interposer. Once oriented with respect to these pins and holes, the PCIe interposer 850 is then pushed downward until the PCIe connector 710 of the PCIe interposer 850 couples with the PCIe baseboard sub-connector 810. This downward movement also results in a portion of the PCIe interposer 850 rests on a surface provided by the retention and support housing 830. The interposer clips are 840 are positioned on the retention and support housing 830 such that when the PCIe interposer 850 couples to the PCIe baseboard sub-connector 810*a* and the retention and support housing 830, the PCIe interposer 850 is locked in position by the interposer clips 840. Once locked in position by the interposer clips 840, the PCIe interposer 850 is prevented from upward movement, thus keeping the PCIe interposer 850 plugged into the PCIe baseboard sub-connector 810*a* and also maintaining the PCIe compliant controller interface 860 in a fixed position that allows a PCIe device to be coupled to the PCIe compliant controller interface 830. In the manner, the interposer clips 840 server to orient and lock the PCIe interposer 850 with respect to the z-axis of the baseboard 820.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
a PCIe (Peripheral Component Interconnect Express) bus comprising a plurality of PCIe lanes; and
a PCIe baseboard connector coupled to the PCIe bus, wherein the PCIe baseboard connector comprises a first baseboard sub-connector and a second baseboard sub-connector and wherein the PCIe baseboard connector:
interfaces with a first riser card that distributes the plurality of PCIe lanes to one or more PCIe connectors provided on the first riser card, wherein the first riser card connects to the first baseboard sub-connector and the second baseboard sub-connector;
interfaces with a second riser card that distributes a first portion of the plurality of PCIe lanes to one or more connectors provided on the second riser card, wherein the second riser card connects to the first baseboard sub-connector; and
interfaces with an interposer card that distributes a second portion of the plurality of PCIe lanes to a PCIe compliant device, wherein the interposer card connects to the second baseboard sub-connector.

2. The IHS of claim 1, wherein the interposer card comprises a PCIe interface for establishing a PCIe connection with the PCIe compliant device.

3. The IHS of claim 2, wherein the PCIe compliant device is an I/O (Input/Output) controller installed as a component of the IHS.

4. The IHS of claim 3, wherein the I/O controller is a storage controller.

5. The IHS of claim 4, wherein the PCIe interface of the interposer card is a PCIe form factor supported by the storage controller.

6. The IHS of claim 1, wherein the PCIe baseboard connector comprises ×32 PCIe lanes, the first baseboard sub-connector comprises ×8 PCIe lanes and the second baseboard sub-connector comprises ×24 PCIe lanes.

7. A system for coupling a PCIe compliant device to a PCIe bus, the system comprising:

the PCIe (Peripheral Component Interconnect Express) bus comprising a plurality of PCIe lanes;

a PCIe baseboard connector coupled to the PCIe bus, wherein the PCIe baseboard connector comprises a first baseboard sub-connector and a second baseboard sub-connector;

a first riser card that distributes the plurality of PCIe lanes to one or more PCIe connectors provided on the first riser card, wherein the first riser card connects to the first baseboard sub-connector and the second baseboard sub-connector;

a second riser card that distributes a first portion of the plurality of PCIe lanes to one or more connectors provided on the second riser card, wherein the second riser card connects to the first baseboard sub-connector; and an interposer card that distributes a second portion of the plurality of PCIe lanes to the PCIe compliant device, wherein the interposer card connects to the second baseboard sub-connector.

8. The system of claim 7, further comprising:

a retention and support housing, wherein the retention and support housing provides a mechanical support for attaching the PCIe compliant device to a baseboard and wherein the retention and support housing comprises a surface for receiving a portion of an interposer card; and the interposer card further comprising a first PCIe interface for coupling with the second baseboard sub-connector and further comprising a second PCIe interface for coupling with the PCIe compliant device, wherein a portion of the interposer rests on the receiving surface of the retention and support housing when coupled with the second baseboard sub-connector and the PCIe compliant device.

9. The system of claim 8, wherein the PCIe compliant device is an I/O (Input/Output) controller installed as a component of the IHS.

10. The system of claim 9, wherein the I/O controller is a storage controller.

11. The system of claim 10, wherein the second PCIe interface of the interposer card is a PCIe form factor supported by the storage controller.

12. The system of claim 8, wherein the retention and support housing comprises two or more pins, and wherein the interposer comprises two or more holes that correspond respectively to the two or more pins.

13. The system of claim 12, wherein the two or more pins of the retention and support housing are mated respectively with the two more holes of the interposer to rest the portion of the interposer on the receiving surface of the retention and support housing.

14. A method for coupling a PCIe (Peripheral Component Interconnect Express) compliant device to a PCIe bus comprising a plurality of PCIe lanes, wherein the PCIe bus is accessed via a PCIe baseboard connector comprising a first baseboard sub-connector and a second baseboard sub-connector, the method comprising:

coupling a first riser card to the first baseboard sub-connector and the second baseboard sub-connector, wherein the riser card distributes the plurality of PCIe lanes of the PCIe bus to one or more PCIe connectors provided on the first riser card;

coupling a second riser card to the first baseboard sub-connector, wherein the second riser card distributes a first portion of the plurality of PCIe lanes to one or more connectors provided on the second riser card; and coupling an interposer card to the second baseboard sub-connector, wherein the interposer card distributes a second portion of the plurality of PCIe lanes to the PCIe compliant device.

15. The method of claim 14, wherein the PCIe compliant device is attached to the baseboard via a retention and support housing, wherein the retention and support housing provides a mechanical support for attaching the PCIe compliant device to the baseboard and wherein the retention and support housing comprises a surface for receiving a portion of the interposer card; and wherein the interposer card further comprises a first PCIe interface for coupling with the second baseboard sub-connector and further comprises a second PCIe interface for coupling with the PCIe compliant device, wherein a portion of the interposer rests on the receiving surface of the retention and support housing when coupled with the second baseboard sub-connector and the PCIe compliant device.

16. The method of claim 15, wherein the PCIe compliant device is an I/O (Input/Output) controller installed as a component of the IHS.

17. The method of claim 16, wherein the I/O controller is a storage controller.

18. The method of claim 17, wherein the second PCIe interface of the interposer card is a PCIe form factor supported by the storage controller.

19. The method of claim 15, wherein the retention and support housing comprises two or more pins, and wherein the interposer comprises two or more holes that correspond respectively to the two or more pins.

20. The method of claim 19, wherein the two or more pins of the retention and support housing are mated respectively with the two more holes of the interposer to rest the portion of the interposer on the receiving surface of the retention and support housing.

* * * * *